Dec. 30, 1947.               C. S. FULLER                 2,433,357
       VULCANIZING POLYESTER SYNTHETIC RUBBERS TO METAL BASES BY MEANS
        OF AN INTERMEDIATE LAYER OF A GLYCEROL PHTHALATE COMPOSITION
                         Filed Nov. 9, 1943
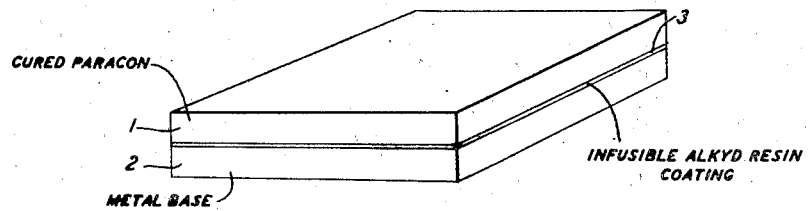
INVENTOR
C. S. FULLER
BY
ATTORNEY Patented Dec. 30, 1947

2,433,357

UNITED STATES PATENT OFFICE 2,433,357

VULCANIZING POLYESTER SYNTHETIC RUBBERS TO METAL BASES BY MEANS OF AN INTERMEDIATE LAYER OF A GLYCEROL PHTHALATE COMPOSITION

Calvin S. Fuller, Chatham, N. J., assignor to Bell Telephone Laboratories, Incorporated, New York, N. Y., a corporation of New York Application November 9, 1943, Serial No. 509,574

13 Claims. (Cl. 154—130)

This invention relates to articles produced by synthetic elastomers known as the paracons to metal.

In the manufacture of many articles, it is necessary to vulcanize an elastomer in contact with a smooth surface of metal or other substance in such manner as to form a strong adhesive bond. Although a reasonably good bond is often formed when the synthetic elastomers known as the paracons are vulcanized with benzoyl peroxide or sulphur in contact with a metal surface, a higher order of bond strength is often required.

According to the present invention a considerably stronger bond is formed between a metal surface and a body of a paracon by first coating the metal surface with a solution of an adherent thermosetting resin containing a large number of ester groups, drying the solution and baking the resin coating. A superior bond is usually formed if the thermosetting resin contains a substantial amount of aliphatic unsaturation. The body of paracon is then cured in contact with the resin coating. A strong bond results.

Any suitable, adherent, heat-curable resin containing a large number of ester groups is suitable for the initial coating. The thermosetting adherent alkyd resins and particularly the glyptal resins have been found to be the most suitable. The glycerol phthalate and glycerol maleate varnishes, particularly those modified with drying oil acids, form the most satisfactory bonds. Drying oil modification of these resins is most commonly accomplished in the art by adding drying oil fatty acids to the initial constituents of the resins during their preparation. Among the most common of the drying oil fatty acids used in the art are the linseed oil fatty acids, although others, such as tung oil fatty acids, are also commonly used.

These resins, not polymerized beyond the soluble state, are applied to the base in solution in any volatile organic solvent. The coating is then dried and baked. The baking may be continued until the resin has been cured to an infusible insoluble state, but preferably the baking is continued only to a point just sufficiently short of this state so that the final cure of the resin takes place during the heating operation involved in the vulcanization of the elastomer.

The desired paracon compound, containing either sulphur or an organic peroxide as a vulcanizing agent, is then applied to the coated base and cured by heating to a vulcanizing temperature under a moderate pressure. The same procedure may be used for bonding paracon to any solid base, whether the base is metal or other material, a resin coating being chosen which is adherent to the base used.

An article, such as may be produced according to the present invention, is shown by way of illustration in the accompanying drawing, in which the single figure is a perspective view of a body of paracon vulcanized to a metal base with an intermediate resin layer. In this figure, the body 1 of vulcanized paracon is firmly bonded to the metal base 2 by means of the thin coating 3 of cured alkyd resin.

The paracons, which are bonded according to the present invention, are prepared by vulcanizing polyesters of high molecular weight which possess insufficient crystallinity to render them rigid and brittle, and particularly those polyesters which are essentially non-crystalline, plastic gums at room temperatures. When these polyesters contain no non-benzenoid unsaturation or limited amounts of such unsaturation, they are cured by intimately mixing them with benzoyl peroxide or other substances having a similar curing action and by heating the mixture to a temperature above the point of decomposition of the curing agent. When the polyesters contain larger amounts of non-benzenoid unsaturation they are cured by intimately mixing them with sulphur and heating to a curing temperature. These elastomers and the methods of curing them are more particularly described and claimed in the copending application C. S. Fuller, Serial No. 485,202, and C. J. Frosch, Serial No. 485,160, filed April 30, 1943, now Patent No. 2,426,994, dated Sept. 9, 1947.

The strictly linear polyesters of high molecular weight containing no non-benzenoid unsaturation are prepared by the superesterification of a glycol with a dicarboxylic acid or of a monohydroxy monocarboxylic acid with itself, in a manner similar, for instance, to that described for crystalline polyesters in United States Patents 2,071,250 and 2,249,950. Polyesters containing non-benzenoid unsaturation may be prepared in the same manner as the fully saturated polyesters, except that one or more of the ingredients of the reaction mixture from which they are prepared contains a properly limited amount of unsaturated carbon-to-carbon bonds.

The polyester gums from which the cured elastomers are prepared are extremely viscous liquids which at room temperatures have a consistence somewhat similar to that of milled crepe rubber, or else they are somewhat flexible, rubbery solids of slight crystallinity, which melt readily at temperatures up to about 20° C. above room temperature to form viscous liquids of a consistency similar to the normally liquid polyesters. These latter substances possess sufficient flexibility, being largely amorphous, to be milled directly on cold rolls, where they are almost instantly reduced to a viscous liquid state by a temperature rise induced by milling.

These polyesters are compounded by milling, preferably on cold rolls, together with the curing agent. In order to impart the desired tensile strength and modulus, finely divided reinforcing pigments are ordinarily milled with the polyester. Particularly suitable reinforcing pigments are the red oxide of iron known as "Mapico 297" and the ultra-fine precipitated calcium carbonate known as "Kalvan."

The tensile strength possessed by the cured polyester is dependent upon the degree of linear growth achieved by the polyester prior to curing. With the strictly linear polyesters prepared from glycols and dicarboxylic acids containing no non-benzenoid unsaturation or from monohydroxy monocarboxylic acids containing no non-benzenoid unsaturation, the degree of linear growth is measured directly by the molecular weight of the polyester, since theoretically each molecule is made up of a single long chain.

There is a relatively sharp increase in the tensile strength of the cured polyesters when the molecular weights of the saturated linear polyesters from which they are prepared achieve and exceed molecular weights in the vicinity of 8,000 to 10,000 as estimated by the Staudinger viscosity method. Linear polyesters of such molecular weights ordinarily possess intrinsic viscosities in chloroform of at least 0.4. Linear polyesters will also possess such molecular weights if they contain an average of at least 500 or 600 atoms in their linear chains, or if they contain at least 98 ester groups for each 100 total ester, hydroxyl and carboxyl groups in the polyester (98 per cent of theoretical complete esterification). The saturated polyesters should possess degrees of linear growth of this order to permit effective curing.

Polyesters formed from reactants, at least one of which contains olefinic unsaturation, will possess these high degrees of linear growth associated with high tensile strength if they contain at least 98 ester groups per 100 total ester, hydroxyl and carboxyl groups in the polyester. When the polyesters contain substantial amounts of olefinic unsaturation it is not always possible to achieve such high degrees of linear growth. However, since the present invention is also applicable to the bonding of polyester elastomers of lower tensile strengths, it is possible to use unsaturated polyesters of considerable lower degrees of linear growth.

In order to produce high degrees of esterification, the reactants from which the polyesters are produced must be subjected to a prolonged heating operation under conditions such as to remove the reaction by-products continuously and effectively, as described, for instance, in United States Patents 2,071,250 and 2,249,950. The reaction by-products are most effectively removed by bubbling an inert gas, such as dry-oxygen-free hydrogen, through the reaction mixture until esterification or condensation has proceeded to the desired degree of completion, with or without the application of reduced pressure. Since unsaturated dicarboxylic acids are more available than unsaturated glycols or unsaturated hydroxy acids, unsaturation is most easily introduced into the polyesters by substituting unsaturated dicarboxylic acids, such as maleic, fumaric, itaconic, mesaconic, muconic or dihydromuconic acid, for a portion of the saturated acid in a glycol and dicarboxylic acid mixture.

As the amount of unsaturation in the polyester increases, the vulcanization with benzoyl peroxide or similar substances becomes more and more sensitive, until ultimately it becomes extremely difficult or even impossible to control the curing reaction so as to produce rubber-like materials instead of substances of low elongation.

In defining the theoretical amount of unsaturation in a polyester produced from bifunctional reactants, it is convenient to assume that the esterification takes place without cross-linking at the double bonds and to define the degree of unsaturation as the ratio of the number of unsaturated carbon-to-carbon bonds to the number of atoms in the linear chain of the average theoretical linear polyester molecule. It is difficult to prevent overcure with benzoyl peroxide or similar substances when the amount of unsaturation exceeds five olefinic bonds per 400 atoms in the theoretical linear chain of the polyester, calculated as described above.

When the unsaturation exceeds five olefinic bonds per 400 atoms in the linear chain, more suitable rubbers are prepared when the polyester is cured with sulphur. Sulphur vulcanization is effective to produce rubbers of good reversible elasticity up to degrees of unsaturation corresponding to about thirteen olefinic bonds per 400 atoms in the linear chain. As the unsaturation is increased substantially above this point, the reversible elasticity is decreased to an undesirably low value.

When the polyester is prepared from saturated glycols and a mixture of saturated dicarboxylic acids and dicarboxylic acids containing olefinic unsaturation, the most effective range of unsaturation for curing with benzoyl peroxide and similar substances occurs when the unsaturated acid constitutes less than about 10 mol per cent of the total dicarboxylic acid mixture. When it is desired to take advantage of the increased rate of cure due to the presence of unsaturation, it is desirable to have at least 1 mol per cent of unsaturated dicarboxylic acid present. For curing with sulphur, the most satisfactory range of unsaturation occurs when the unsaturated acid constitutes between about 10 mol per cent and about 25 mol per cent of the total dicarboxylic acid mixture.

When large amounts of unsaturation are present in the reaction mixture from which the polyester is formed, the reaction mixture will ultimately gel because of cross-linking at the double bonds. The reaction must be interrupted before substantial gelation has occurred so that the resulting polyester will be sufficiently fluid or plastic to permit compounding with sulphur and other substances. To secure maximum tensile strength in the cured polyester, the reaction should be carried out under conditions which will insure the maximum degree of esterification before the reaction is interrupted. When the polyester is to be cured with sulphur, the cross-linking reaction can be suppressed by incorporating an antioxidant in the reaction mixture.

The cured elastomers produced from the polyesters described above will have good reversible elasticity only if the polyesters are capable of flow at room temperature or at temperatures not substantially above room temperature. Since polyesters possessing a high degree of crystallinity are essentially rigid, good rubbers can be obtained only from polyesters which are essentially non-crystalline at room temperatures. Polyesters which possess a small amount of crystallinity, sufficient substantially to destroy their property of flow under moderate stress, are nevertheless suitable for the preparation of the cured elastomers which are bonded by the present invention, provided their crystallinity is not sufficient to render them hard and brittle and provided their crystalline melting point is not greater than about 20° C. above room temperature. The crystallinity of such polyesters is reduced by the process of vulcanization so that in many cases they may behave, at room temperatures, not substantially different from the cured polyesters which were originally viscous liquids. Even when the crystallinity remaining after vulcanization is sufficient to render the products boardy at room temperature or below, the heat generated by distortion under stress is sufficient to reduce or destroy the crystallinity rapidly and thus produce true rubber-like behavior very shortly after the application of the stress.

In producing such non-crystalline polyesters or polyesters of limited crystallinity, advantage is taken of the fact that certain ingredients lead to polyesters which are incapable of crystallization or which have crystalline melting points below room temperatures or which crystallize so slowly that for practical purposes they may be considered permanently non-crystalline.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or heteroatoms in the linear chain, are usually non-crystalline. However, if the other member of the reaction mixture is a polymethylene glycol or a polymethylene dicarboxylic acid the crystallizing tendencies of the polyester increase as the length of the polymethylene chain increases. Thus dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol or methylethylene glycol. This glycol forms non-crystalline polyesters with polymethylene dicarboxylic acids between succinic acid and sebacic acid. Polyisopropylene succinate does not become excessively crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing excessive crystallization.

Although dicarboxylic acids containing conjugated unsaturation, such as maleic or fumaric acid, form non-crystalline polyesters with the common polymethylene glycols, they are used in such small concentrations in the polyesters of the present invention that their presence alone is usually not sufficient to result in the necessary degree of non-crystallinity.

The most available of the non-crystalline polyester forming reactants containing hetero-atoms are diethylene glycol and di-isopropylene glycol. Diglycolic acid is also of some interest as a heteroatom containing compound. The most available of the aromatic ring containing reactants is phthalic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly and are therefore useful for forming paracon elastomers.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids, or similar polyesters in which maleic acid is substituted for portions of the succinic acid, the disorder imparts sufficient non-crystallinity to permit the polyester to be used for the formation of a cured paracon elastomer.

Those polyesters curable with benzoyl peroxide are compounded by intimately mixing them with a small amount of benzoyl peroxide and heating them to a temperature above 105° C. and preferably to a temperature between about 120° C. and 140° C. The amount of benzoyl peroxide used for curing will vary between about 0.5 per cent and .5 per cent by weight, the amount depending primarily upon the amount of unsaturation, but also upon the nature of the saturated ingredients. Although benzoyl peroxide has been found the most effective cross-linking agent, other acyl peroxides, such as lauryl peroxide, have also been found particularly effective. Certain other organic peroxides are sufficiently effective to render them usable as curing agents, particularly when the polyesters contain unsaturation.

Those polyesters which contain a sufficient amount of unsaturation for effective curing with sulphur are compounded by intimately mixing them with sulphur and the other compounding ingredients and heating them to a curing temperature. It is ordinarily desirable to include in the compound a vulcanization accelerator, such as tetramethylthiuram disulphide. The amount of sulphur and accelerator is not critical. Ordinarily between about 1 per cent and about 3 per cent by weight of sulphur and between about 1 per cent and 3 per cent by weight of accelerator will be suitable.

The most suitable temperatures for curing with sulphur will ordinarily be found to lie between about 120° C. and about 150° C. The time required for curing will vary with the degree of unsaturation, the amount of sulphur, the kind and amount of accelerator and the curing temperature.

The paracon compounds employed for the purposes of the present invention will ordinarily contain finely divided reinforcing pigments, such as the colloidal carbon-blacks (when sulphur cured), the red oxide of iron known as "Mapico 297," or the ultra-fine precipitated calcium carbonate known as "Kalvan." The optimum amounts of "Mapico 297" are between 100 and 150 per cent by weight; the optimum amounts of "Kalvan" are between about 40 per cent and 75 per cent by weight. Other compatible rubber compounding ingredients such as other mineral fillers, softeners, plasticizers, paraffin waxes and, in the case of sulphur cured compounds, antioxidants, may be added to produce the desired physical properties.

Although the invention has been described in terms of its specific embodiments, certain modifications and equivalents will be apparent to those skilled in the art and are intended to be included within the scope of the present invention which is to be limited only by the reasonable scope of the appended claims.

What is claimed is:

1. An article comprising a base of metal having an adherent baked coating of a drying oil modified glycerol phthalate which has vulcanized thereto by means of benzoyl peroxide a body of a polyisopropylene ethylene sebacate maleate elastomer.

2. An article comprising a base of metal having an adherent baked coating of a drying oil modified glycerol phthalate which has vulcanized thereto a body of a polyisopropylene ethylene sebacate maleate elastomer.

3. An article comprising a base of metal having an adherent baked coating of glycerol phthalate which has vulcanized thereto a body of a polyisopropylene ethylene sebacate maleate elastomer.

4. An article comprising a base of metal having an adherent baked coating of glycerol phthalate which has vulcanized thereto by means of benzoyl peroxide a body of a polyisopropylene ethylene sebacate maleate elastomer.

5. An article comprising a base of metal having an adherent baked coating of a drying oil modified glycerol phthalate which has vulcanized thereto by means of sulphur a body of a polyisopropylene ethylene sebacate maleate elastomer.

6. An article comprising a base of metal having an adherent baked coating of a drying oil modified glycerol phthalate which has vulcanized thereto by means of benzoyl peroxide a body of a polyisopropylene ethylene succinate maleate elastomer.

7. An article comprising a base of metal having an adherent baked coating of a drying oil modified glycerol phthalate which has vulcanized thereto a body of a polyisopropylene ethylene succinate maleate elastomer.

8. An article comprising a base of metal having an adhered baked coating of glycerol phthalate which has vulcanized thereto a body of a polyisopropylene ethylene succinate maleate elastomer.

9. An article comprising a base of metal having an adherent baked coating of glycerol phthalate which has vulcanized thereto by means of benzoyl peroxide a body of a polyisopropylene ethylene succinate maleate elastomer.

10. An article comprising a base of metal having an adherent baked coating of a drying oil modified glycerol phthalate which has vulcanized thereto by means of sulphur a body of a polyisopropylene ethylene succinate maleate elastomer.

11. An article comprising a base of metal having an adherent baked coating of a drying oil modified glycerol phthalate which has vulcanized thereto by means of benzoyl peroxide a body of a polyisopropylene ethylene alkanedicarboxylate maleate elastomer, the alkanedicarboxylate residue of said elastomer being a polymethylene dicarboxylate residue.

12. An article comprising a base of metal having an adherent baked coating of glycerol phthalate which has vulcanized thereto by means of benzoyl peroxide a body of a dihydroxyalkane-dicarboxyalkane-maleic acid polyester elastomer.

13. An article comprising a base of metal having an adherent baked coating of glycerol phthalate which has vulcanized thereto by means of benzoyl peroxide a body of a dihydroxyalkane-dicarboxyhydro-carbon polyester elastomer.

CALVIN S. FULLER.

REFERENCES CITED

The following references are of record in the file of this patent:

UNITED STATES PATENTS

| Number | Name | Date |
|---|---|---|
| 2,249,950 | Fuller | July 22, 1941 |
| 2,071,250 | Carothers | Feb. 16, 1937 |

OTHER REFERENCES

"Alkyd Resins as Film-Forming Materials," Industrial and Engineering Chemistry for Apr. 1929, pages 349–351.

"Paracons," in Chemical Engineering News for June 25, 1943, pages 962–3.